US011416816B1

(12) United States Patent
Collier et al.

(10) Patent No.: US 11,416,816 B1
(45) Date of Patent: Aug. 16, 2022

(54) AUTOMATED GENERATION OF COMPONENTS LIST TO IMPLEMENT CODE-COMPLIANT SEQUENCE OF OPERATIONS

(71) Applicant: ABL IP Holding LLC, Decatur, GA (US)

(72) Inventors: Jesse Collier, Stockbridge, GA (US); Taylor Powell, Decatur, GA (US)

(73) Assignee: ABL IP Holding LLC, Atlanta, GA (US)

( * ) Notice: Subject to any disclaimer, the term of this patent is extended or adjusted under 35 U.S.C. 154(b) by 23 days.

(21) Appl. No.: 16/808,214

(22) Filed: Mar. 3, 2020

(51) Int. Cl.
*G06Q 10/00* (2012.01)
*G06Q 10/08* (2012.01)
*G06Q 10/06* (2012.01)
*G06Q 50/08* (2012.01)
*G06Q 50/04* (2012.01)

(52) U.S. Cl.
CPC ... *G06Q 10/0875* (2013.01); *G06Q 10/06316* (2013.01); *G06Q 50/04* (2013.01); *G06Q 50/08* (2013.01)

(58) Field of Classification Search
CPC ......... G06Q 10/0875; G06Q 10/06316; G06Q 50/04
See application file for complete search history.

(56) References Cited

U.S. PATENT DOCUMENTS

| 6,553,432 B1 * | 4/2003 | Critz | G06F 3/0632 |
| | | | 713/1 |
| 2016/0085884 A1 * | 3/2016 | Schafer | G06Q 30/0611 |
| | | | 703/1 |

OTHER PUBLICATIONS

Lutron Electronics Co., Inc.,"QuEst-D", pp. 1-2 (retrieved on May 5, 2020 from https://www.lutron.com/en-US/Pages/PromoPages/quickestimatedesignassistant.aspx).

* cited by examiner

*Primary Examiner* — Rokib Masud
(74) *Attorney, Agent, or Firm* — Raubvogel Law Office

(57) ABSTRACT

A software tool automatically generates a components list (also known as a "solution", "recipe", or "bill of materials") to be used in completing an installation. This components list may include, for example, fixtures and control devices for use in implementing lighting solutions for a building. The system takes as input a sequence of operations table, and identifies components to satisfy the requirements specified in the sequence of operations table. A number of different solutions may be presented, offering different configurations, cost levels, product lines, and/or the like; the different solutions may also indicate different degrees to which controls are embedded in fixtures. The user can then select among the presented solutions, and/or can perform other operations to change the configuration and/or parameters so as to generate new options.

51 Claims, 12 Drawing Sheets

① Start ——————— ② Specific Operations ——————— ③ Review Parts Recommendations

② Select the product line to receive recommendations  ⟵ 352

Product Line ⟵ 351
nLight (Wired Controls) ▾

| Room Type | Best 354A | | Better 354B | | Good 354C |
|---|---|---|---|---|---|
| Private Office<br>nLight (Wired Controls) ▾<br>⟵ 353 | Controls<br>nPODM DX<br>⟵ 356 | Troffers<br>359 ⊙ 2BLT4 30L ADP EZ1<br>LP830 NES7PDT<br>358 ⟵ view spec ⟵ 355<br>359 ⊙ 2BLT2 30L ADP EZ1<br>LP830 NES7PDT<br>view spec ⟵ 355<br>⟵ 358 | Controls<br>nCM PDT 9<br>ADCX<br>nPODM DX<br>⟵ 356 | Downlights<br>359 ⊙ EVO SQ 30/45 4AR LSS MVOLT<br>NPS80EZ EZ10<br>view spec ⟵ 355<br>Troffers<br>359 ⊙ 2BLT4 30L ADP EZ1 LP830 N100 ⟵ 355<br>view spec ⟵ 358<br>359 ⊙ 2BLT2 30L ADP EZ1 LP830 N100 ⟵ 355<br>view spec ⟵ 358 | |
| Warehouse<br>nLight (Wired Controls) ▾<br>⟵ 353 | Controls<br>nPODM DX<br>⟵ 356 | Troffers | Controls<br>nPODM DX<br>⟵ 356 | Downlights | |

AUTOMATED GENERATION OF COMPONENTS LIST TO IMPLEMENT CODE-COMPLIANT SEQUENCE OF OPERATIONS

CROSS-REFERENCE TO RELATED APPLICATIONS

The present application is related to U.S. Utility application Ser. No. 16/808,210, for "Automated Generation of Code-Compliant Sequence of Operations," filed on the same date as the present application, and incorporated by reference herein in its entirety.

TECHNICAL FIELD

The present document relates to generation of a components list, such as a bill of materials, for a building, installation, room, and/or structure.

DESCRIPTION OF THE RELATED ART

Building codes and other regulatory schemes often specify particular requirements for buildings, lighting fixtures, control devices, installations, and structures. In modern construction, a large number of components may interact with one another and operate in concert to provide lighting for a building, room, or other structure. One way such components and their operations can be specified, configured, and controlled is via a sequence of operations, which sets forth a manner in which a lighting control system should operate so as to provide a desired lighting environment that complies with code requirements.

A bill of materials, or BOM, is a components list that may be used in manufacturing or configuring an end product or installation. In the context of BOMs for installations involving a large number of control devices and/or fixtures, it can be challenging to ensure that the BOM results in a code-compliant installation, and that the BOM successfully implements the requirements set forth in a sequence of operations. Existing techniques also fail to provide an effective method for automatically generating a BOM to satisfy a sequence of operations. In addition, it can be challenging to identify configurations where controls may be embedded within fixtures to different degrees, particularly when requirements may change over time.

SUMMARY

In at least one embodiment, the system and method described herein can be implemented as a software tool for automatically generating a components list (also known as a "solution", "recipe", or "bill of materials") to be used in completing an installation. This components list can then be used as a parts list for installers or builders to use in constructing or installing a building, structure, room, or the like. In at least one embodiment, the system and method can generate different versions of the components list, for example to provide different options for the installation; such a technique can be useful so as to evaluate cost trade-offs and/or to address situations where some components may not be available, or where some components may or may not be compatible with other components.

In at least one embodiment, the system takes as input a dynamic, code-compliant sequence of operations (SOO) table, as generated according to the above-referenced related U.S. Utility application Ser. No. 16/808,210, for "Automated Generation of Code-Compliant Sequence of Operations," filed on the same date as the present application, and incorporated by reference herein in its entirety. The system then automatically generates a components list having control devices and fixtures that comply with and execute the SOO set forth in the table. In at least one embodiment, a number of different solutions are presented (such as, for example, three solutions). These solutions may be presented adjacent to one another for ease of comparison. For example, the system may present a first solution having control devices that are stand-alone with respect to fixtures; a second solution in which on/off controls are embedded in fixtures; and a third solution in which on/off and sensor controls are embedded in fixtures. Any number of different solutions can be presented in this manner, having different characteristics and/or costs.

The user can then select among the presented solutions, and/or can perform other operations to change the configuration and/or parameters so as to generate new options.

In at least one embodiment, the described system and method generate the components list in whatever output form is desired or appropriate. In at least one embodiment, users can customize the generated components list as desired.

In at least one embodiment, the described system and method provide output in a format that is easily exported for use in other tools, such as a room layout generator 123 that generates room layout diagram 341 for the installation. In at least one embodiment, a user can customize the output format to his or her particular needs, so as to ensure maximum compatibility with existing systems and standards.

As described in more detail herein, the configuration and generation of the components list can be automatic, requiring a minimum of user involvement and expertise.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 3A and 3B are screenshot diagrams depicting examples of a user interface for a screen for presenting components lists, according to one embodiment.

DETAILED DESCRIPTION OF THE EMBODIMENTS

In at least one embodiment, the system and method described herein automatically generate a components list to implement a code-compliant sequence of operations ("SOO"). In at least one embodiment, the system and method can generate different versions of the components list, for example to provide different options for the installation; such a technique can be useful so as to evaluate cost trade-offs and/or to address situations where some components may not be available, or where some components may or may not be compatible with other components.

In at least one embodiment, the components list generated by the described system and method is based on a dynamic, user-entered SOO, and includes components such as control devices and fixtures. Any number of different configurations (such as, for example, three different configurations) can be presented adjacent to one another, so that the user can compare them with one another and select among them. In at least one embodiment, the different configurations include, for example: a first configuration in which control devices are stand-alone with respect to fixtures; a second configuration in which on/off controls are embedded (or integrated) in fixtures, but sensor controls are implemented as stand-alone devices; and a third configuration in which on/off and sensor controls are embedded (or integrated) in fixtures.

Figure 1A:
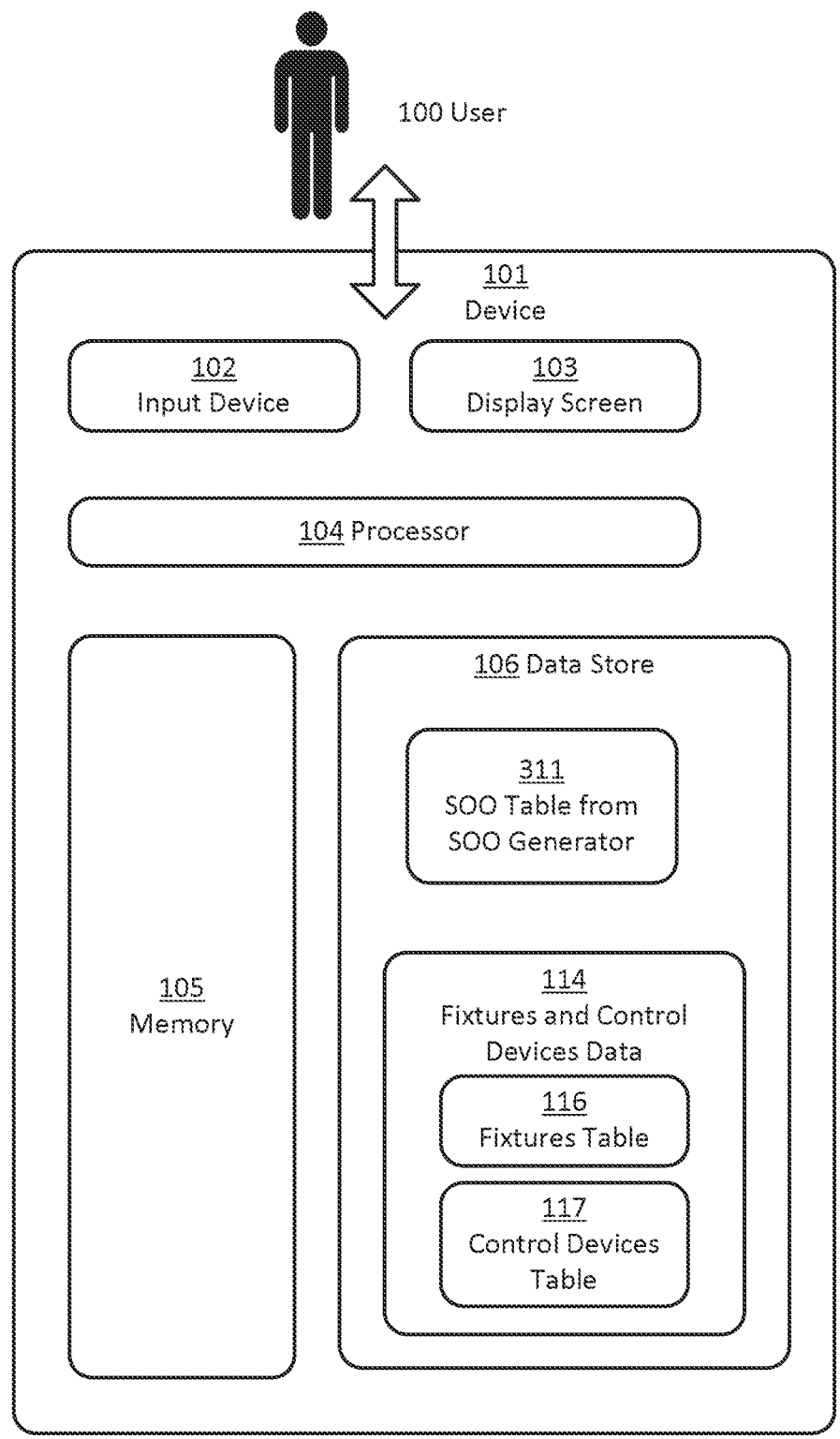
FIG. 1A is a block diagram depicting a hardware architecture for a system for automatic generation of a components list to implement a code-compliant sequence of operations, according to one embodiment.
Figure 1B:
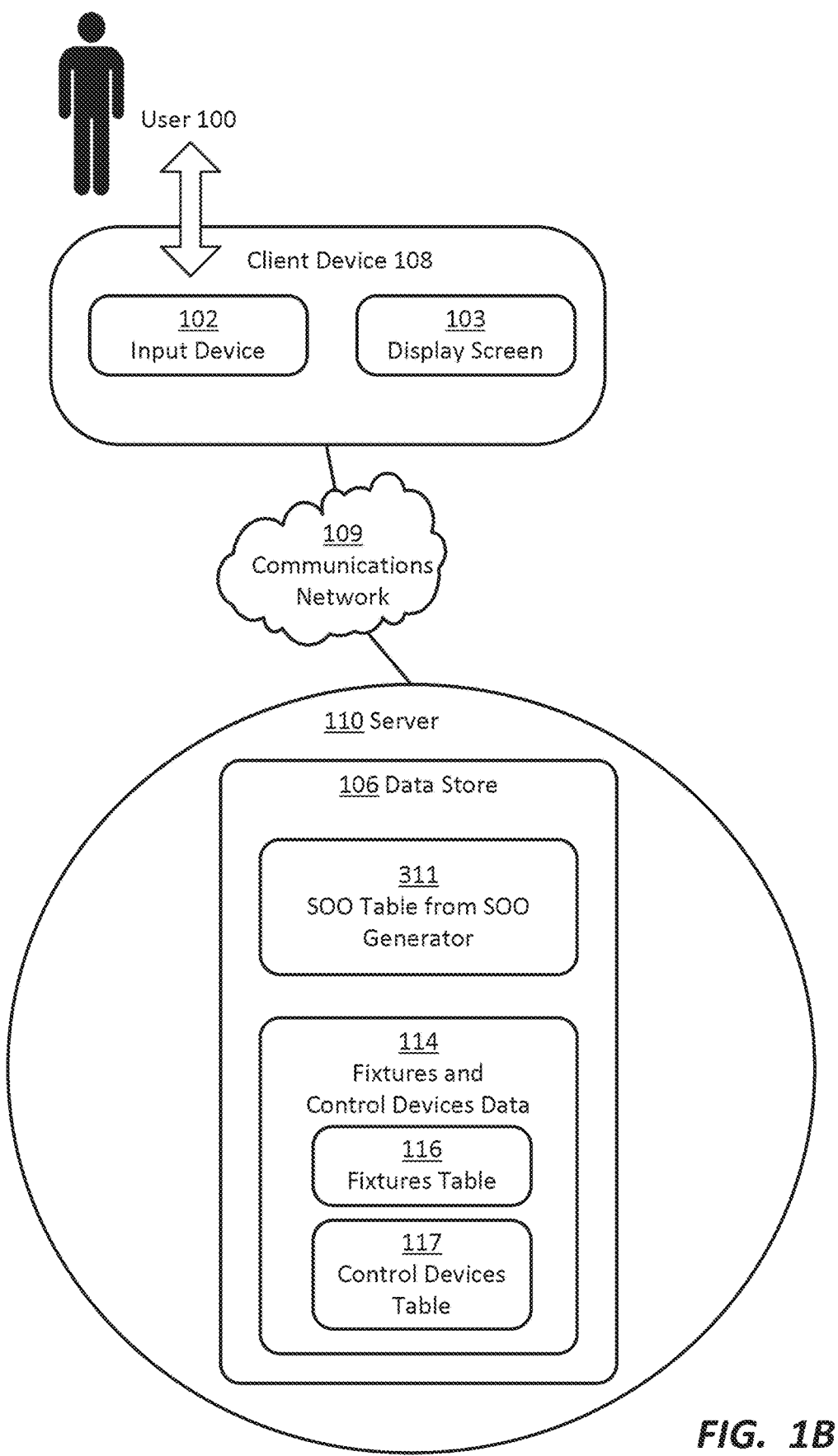
FIG. 1B is a block diagram depicting a hardware architecture for a system for automatic generation of a components list to implement a code-compliant sequence of operations, according to another embodiment.

In some embodiments, one or more devices 101 and/or client devices 108, as shown in FIGS. 1A and 1B, may be used to implement the system and method for generating the components list and performing other functions. Thus, in the figures and descriptions below, it will be understood that any of the components and/or method steps shown or described may be implemented in one or more of the devices 101 and/or client devices 108. Further, the functions and/or method steps set forth below may be carried out by software running on the one or more of the devices 101 and/or client devices 108. This software may optionally be multi-function software that is used to receive SOO tables, fixtures and control devices data, and/or the like. For ease of description, the software running on devices 101 and/or client devices 108 for generating the components list is referred to herein as solution generator 122.

In this application, a "sequence of operations", or SOO, is a control scheme that defines the behavior of fixtures and/or control devices within a space such as a room or room type. Typically, the steps and operations set forth in the SOO are executed when a participant, such as an individual, interacts with the control devices in the space. Such interaction can include, for example, the participant manually activating or adjusting a switch or control device, or alternatively, a motion detector or other sensor detecting presence or activity of the participant in the space. In the context of the present application, the SOO is generated in table form, and is often referred to as a "sequence of operations table" or "SOO table."

In this application, a "building" is any type of physical structure that can be occupied. A "building type" is a category of building. A "room" or "space" is any definable space within a building. A "room type" (or "space type", or "typical") is a category of room or space within a building. A "code type" is a design guideline or type of building code applicable to a particular building or building type. A "fixture" is a device located in a room or otherwise positioned to affect some characteristic of a room, such as lighting. A "control device" (or "control") is a device, typically but not necessarily operable by a human being, configured to affect the operation of at least one fixture, control device, or third-party system or component. A "sensor" is a device that senses and responds to an environmental condition and/or behavior of an individual. A "component" (or "product") is a fixture or control device (including a sensor). A "building code" or "building code requirement" is a requirement or standard, typically set forth by a governmental entity, specifying some required characteristic for a room, building, fixture, or other construction element. The terms "components list", "bill of materials", "BOM", "solution", and "recipe" are used interchangeably to refer to a list of fixtures and/or control devices that may implement a SOO. A "room layout diagram", "room layout", or "typical layout" is a diagram setting forth a layout or arrangement of fixtures and/or control devices for a particular room or room type, based on a generated solution or recipe.

In this application, a step that is performed "automatically" is a step that is carried out without requiring user input (beyond that provided prior to initiation of the step that is performed "automatically").

For illustrative purposes, the system and method are described herein in terms of generation of a components list for implementing a SOO for lighting fixtures, such as those installed in a building. One skilled in the art will recognize, however, that such description is merely illustrative, and that the techniques set forth herein can be applied in many other contexts and in connection with other components and environments. For example, and without limitation, the techniques set forth herein can be applied to generation of a components list (or equivalent output) for elements such as: heating, ventilation, and air conditioning (HVAC), audiovisual (AV) integration, doors, windows, building automation and control (BAC) networks, plug load control devices, power sources, and/or the like. In addition, the techniques set forth herein can be applied to installations other than buildings, such as for example, vehicles, portable devices, and/or the like. In addition, the techniques set forth herein can be applied to any combination of the above-listed and/or other elements.

Overall Functional Architecture

Figure 1C:
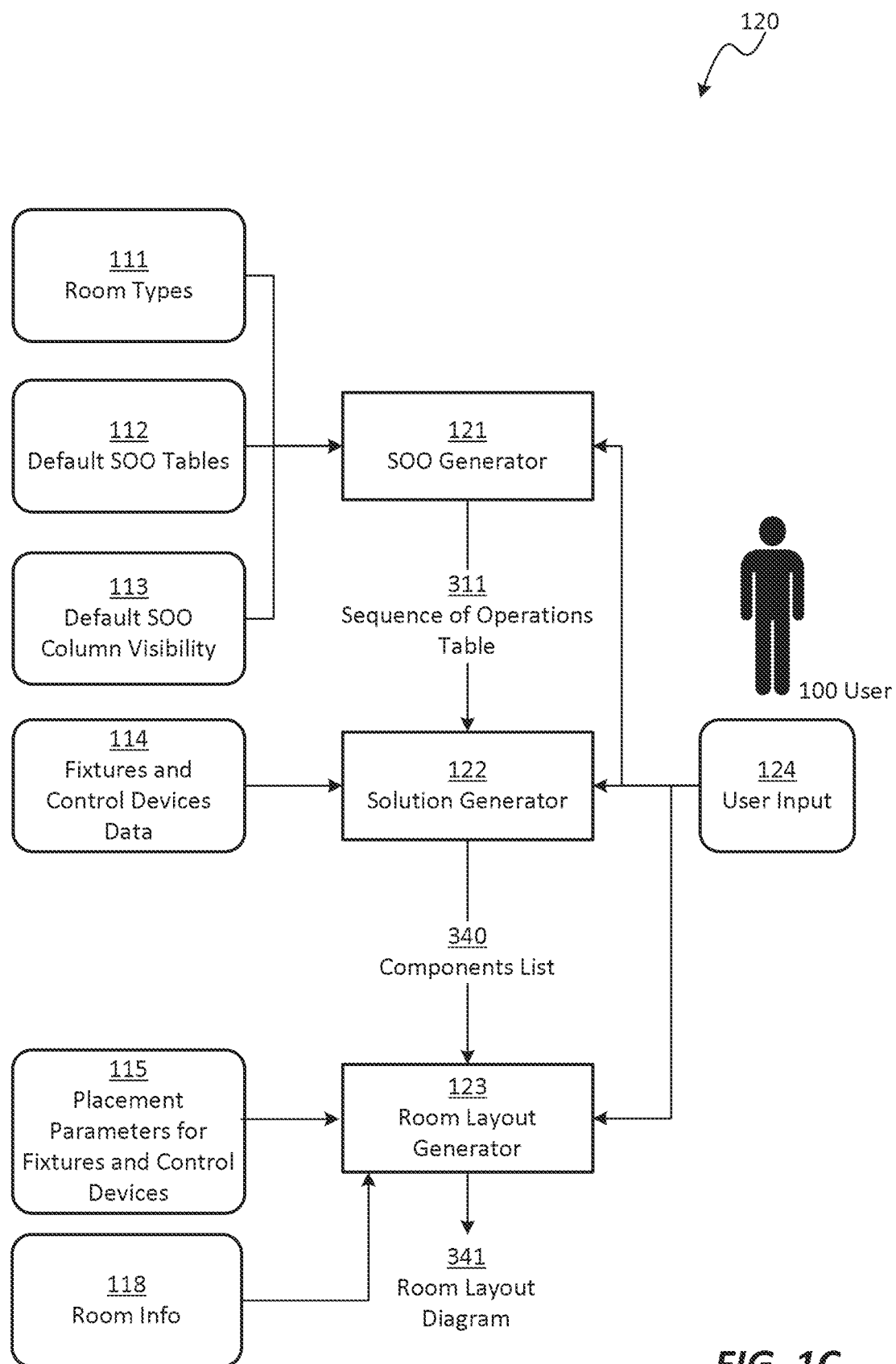
FIG. 1C is a block diagram depicting an overall functional architecture for a system that performs automatic generation of a sequence of operations table, automatic generation of a components list to implement the sequence of operations, and automatic generation of a room layout diagram, according to one embodiment.

Referring now to FIG. 1C, there is shown a block diagram depicting an overall functional architecture 120 for a system that performs automatic generation of a sequence of operations table 311, components list 340 generation, and room layout diagram 341 generation, according to one embodiment.

In at least one embodiment, the system and method described herein provide functionality for generating components list 340. In FIG. 1C, this functionality is performed by the entity referred to as solution generator 122, which may be implemented as software running on one of the architectures depicted in FIG. 1A or 1B. As described in more detail herein, solution generator 122 receives SOO table 311 from SOO generator 121, and also retrieves fixtures and control devices data 114 from data store 106 or another source. Based on this information, solution generator 122 automatically generates components list 340 for output according to any suitable format. Additional details concerning the operation of SOO generator 121 are set forth in the above-referenced related U.S. patent application Ser. No. 16/808,210 for "Automated Generation of Code-Compliant Sequence of Operations," filed on the same date as the present application, and incorporated by reference herein in its entirety.

In at least one embodiment, the system also provides functionality to allow user 100 to modify and/or edit generated components list 340.

Once generated, components list 340 can be used to automatically generate a room layout diagram 341, or "typical" layout, for each room type within the building. Room layout diagram 341 can specify how the various components listed in components list 340 are to be arranged and connected to one another. Room layout generator 123 can take into account room info 118, stored data 115 describing placement parameters for fixtures and control devices, and user input 124, in generating room layout diagram 341.

For illustrative purposes, the operation of solution generator 122 is described herein as a stand-alone functional module that can be implemented in hardware, software, or any combination thereof. One skilled in the art will recognize that in various embodiments, solution generator 122 can be implemented using the same hardware and software components as SOO generator 121 and/or room layout generator 123. Alternatively, such components can be implemented separately from one another using different software and/or hardware components.

Thus, in one embodiment, solution generator 122 can be considered a separate functional component that generates output as described below. Alternatively, solution generator 122 can be considered as a component that is integrated with other components, such as SOO generator 121 and room layout generator 123, receiving input from SOO generator 121 and providing output to room layout generator 123.

System Architecture

According to various embodiments, the system can be implemented on one or more electronic devices equipped to receive, store, and present information. Such electronic device(s) may include, for example, any one or more of: a desktop computer, laptop computer, smartphone, tablet computer, smartphone/tablet ("phablet"), wearable computing device, and/or the like.

Although the system is described herein as being implemented as a web-based application, one skilled in the art will recognize that the techniques described herein can be implemented in other ways, and indeed using any suitable device, network, and/or combination of devices. Accordingly, the following description is intended to illustrate various embodiments by way of example, rather than to limit scope.

Referring now to FIG. 1A, there is shown a block diagram depicting a hardware architecture for automatic generation of components list 340 to implement a code-compliant sequence of operations, according to one embodiment. Such an architecture can be used, for example, for implementing the techniques of the system in a computer or other electronic device 101. One skilled in the art will recognize that the particular arrangement of components depicted in FIG. 1A is merely exemplary, and that the system can be implemented using other components and arrangements.

In at least one embodiment, device 101 includes a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, such as on cloud-based storage, and retrieved by device 101 when needed for presentation to user 100. Data store 106 may store one or more data sets, which may be used for a variety of purposes and may include a wide variety of files, metadata, and/or other data. In at least one embodiment, data store 106 may include data such as SOO table 311, fixtures and control device data 114 (including fixtures table 116 and control devices table 117), and/or other data.

Display screen 103 can be any element that graphically displays information such as items from data store 106 and/or the results of steps performed on such items to provide information useful to a user. Such output may include, for example, tables, charts, graphs, images, schematics, facility maps or diagrams, menus, user interface elements, navigational elements, queries requesting information or selections from the user, and/or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. In at least one embodiment, the described method for generating components list 340 is performed by software running on processor 104. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device (or set of devices) and/or from cloud-based storage, when needed. Such communication between device 101 and other components can take place via any suitable wired or wireless communication means, such as via a computing network such as the Internet, a cellular network, or the like. This communication with other electronic devices is provided as an example and is not necessary.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate data elements with each other. Data store 106 may include any of a wide variety of data structures known in the information storage arts, such as databases and other suitable data storage structures.

Referring now to FIG. 1B, there is shown a block diagram depicting a hardware architecture for automatic generation of a components list 340 to implement a code-compliant sequence of operations, according to another embodiment that operates in a client/server environment. Such an implementation may use a "black box" approach, whereby data storage and processing are done completely independently from user input/output, and wherein the functionality described herein is implemented in a cloud-based client/server architecture. An example of such a client/server environment is a web-based implementation, wherein client device 108 runs a browser that provides a user interface for interacting with web pages and/or other web-based resources from server 110. Items from data store 106, reports, and/or other data derived from data store 106 can be presented as part of such web pages and/or other web-based resources, using known protocols and languages such as Hypertext Markup Language (HTML), Java, JavaScript, and the like. Application server(s), web server(s), load balancer(s), and/or other components (not shown) may be used to receive, process, and respond to data requests received from client machines, according to well known methods.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable computing device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106. Server 110 may include additional components as needed for retrieving data from data store 106 in response to requests from client device 108.

In one embodiment, in either of the architectures shown in FIG. 1A or 1B, some or all of the system components can be implemented as software written in any suitable computer programming language, whether in a stand-alone or client/server architecture. Examples of computer programming languages that can be used for implementing the system components and functionality described herein include JavaScript, TypeScript, and React. The code that implements the functionality described herein may be client-based, server-based, or any suitable combination thereof. Alternatively, any or all of such components and/or functionality may be implemented and/or embedded in hardware.

In general, the data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 may include SOO table 311, fixtures and control devices data 114, and/or other data.

Data Structures for Generating and Editing Components List 340

In general, data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer.

As mentioned previously, data store 106 may include SOO table 311, fixtures and control devices data 114, and/or other data. In at least one embodiment, such data can be organized into tables, including for example:

fixtures table 116, including a list of fixtures that may be used for implementing a sequence of operations;

control devices table 117, including a list of control devices that may be used for implementing a sequence of operations; and SOO table 311 as may be generated by SOO generator 121.

In at least one embodiment, the database(s) also maintain associations between specific requirements specified by SOOs and control devices and fixtures. As described in more detail below, one or more admin screen(s) can be provided to create and edit such associations.

In at least one embodiment, fixtures table 116 contains information describing a number of different fixtures that can be used or installed when implementing a SOO. Fixtures table 116 may contain, for example, raw information describing fixtures; this can help to sort fixtures by type and/or product group, and to pair fixtures with compatible control devices within a product line. In at least one embodiment, fixtures table 116 includes lists of fixtures for all predefined room types, based for example on industry recommended aesthetic and functional characteristics and suitability of fixtures for each room type.

In at least one embodiment, for each fixture, fixtures table 116 specifies any or all of a part name, part number, manufacturer, cost, associated product line, product type(s), and/or the like. Fixtures table 116 also specifies which SOOs the fixture can satisfy. In at least one embodiment, fixtures table 116 also specifies a device type for each fixture, which can be used to group fixtures under headers when they are to be displayed by solution generator 122. In at least one embodiment, fixtures table 116 also specifies an optional priority for each fixture, so as to resolve situations where two different fixtures are deemed to be suitable for satisfying a given SOO. In at least one embodiment, fixtures table 116 also specifies filters for each fixture, based on any suitable parameters, such as room size, ceiling height, and/or the like; such filters can be used to limit the applicability of a particular fixture to certain rooms or room types based on parameters. In at least one embodiment, fixtures table 116 also includes images and specification sheets (and/or links to such information) for the various fixtures. In addition, in at least one embodiment, some part of a fixture's part number can be shown in a distinctive color or visual attribute (such as by underlining) to indicate optional segments of the part number that can vary based on aesthetic changes such as device color.

In at least one embodiment, fixtures table 116 is organized by room type, with fixtures sorted therein by control scheme: those fixtures that include controls as part of the fixtures; those that have controls somewhat integrated (i.e., embedded) into the fixtures; and those having controls implemented as stand-alone devices.

In at least one embodiment, control devices table 117 contains information describing a number of different control devices that can be used or installed when implementing a SOO. For each control device, control devices table 117 specifies any or all of a part name, part number, manufacturer, cost, associated product line, product type(s), and/or the like. Control devices table 117 also specifies which SOOs the control device can satisfy. In at least one embodiment, control devices table 117 also specifies a device type for each control device, which can be used to group control devices under headers when they are to be displayed by solution generator 122. In at least one embodiment, control devices table 117 also specifies an optional priority for each control device, so as to resolve situations where two different control devices are deemed to be suitable for satisfying a given SOO. In at least one embodiment, control devices table 117 also specifies filters for each control device, based on any suitable parameters, such as room size, ceiling height, and/or the like; such filters can be used to limit the applicability of a particular control device to certain rooms or room types based on parameters. In at least one embodiment, control devices table 117 also includes images and specification sheets (and/or links to such information) for the various control devices. In addition, in at least one embodiment, some part of a control device's part number can be shown in a distinctive color or visual attribute (such as by underlining) to indicate optional segments of the part number that can vary based on aesthetic changes such as device color.

Fixtures table 116 can also indicate which control devices are compatible with each fixture. Similarly, control devices table 117 can indicate which fixtures are compatible with each control device.

In at least one embodiment, a separate table can be generated from fixtures table 116 and control devices table 117, to place specific fixtures from fixtures table 116 into rooms or room types as suggestions. Columns can be populated, corresponding to the columns generated by solution generator 122 as described below. In one embodiment, these columns are then automatically filtered so that they only include those options from fixtures table 116 and control devices table 117 that are compatible with one another. In at least one embodiment, once fixtures are added to a room or room type, they are automatically sorted by their type under the appropriate header. In at least one embodiment, user 100 can indicate that certain fixtures are preferred ("favorites"), so that they appear at the top of the list of suggestions as a demand-shaping tool.

In at least one embodiment, fixtures table 116 specifies, for each fixture, different levels of embedded (or integrated) controls that are considered compatible with that fixture. For example, three levels of embedded controls can be specified for each fixture: no embedded controls; embedded on/off and raise/lower controls; and embedded sensor controls, as follows:

For the "no embedded controls" option, all control devices are stand-alone with respect to fixtures, and the full list of control devices specified by SOO generator 121 is required.

For the "embedded on/off and raise lower controls" option, some controls (such as on/off and raise/lower) are embedded in fixtures, while others are implemented as stand-alone devices. Solutions may vary depending on product line. For example, a fixture of one product line embedded may not be compatible with a different product line of control devices. In at least one embodiment, the list of compatible control devices omits relays, as those are assumed to be embedded in the fixtures.

For the "embedded sensor controls" option, on/off, raise/lower, and sensor controls are embedded in fixtures. Again, solutions may vary depending on product line. In at least one embodiment, the list of compatible control devices omits relays and occupancy/daylight sensors, as those controls are assumed to be embedded in the fixtures.

In at least one embodiment, these different level of controls can be established within fixtures table 116, so that, once a baseline of controls (for no embedded fixture options) is established, new columns can be easily generated, and compatibility can be assured. The output of the system thus takes into account any possible redundancy owing to the fact that some features may be embedded in fixtures, meaning that no control devices for those features need be provided separately.

Method for Generating and Editing Components List 340

Figure 2A:
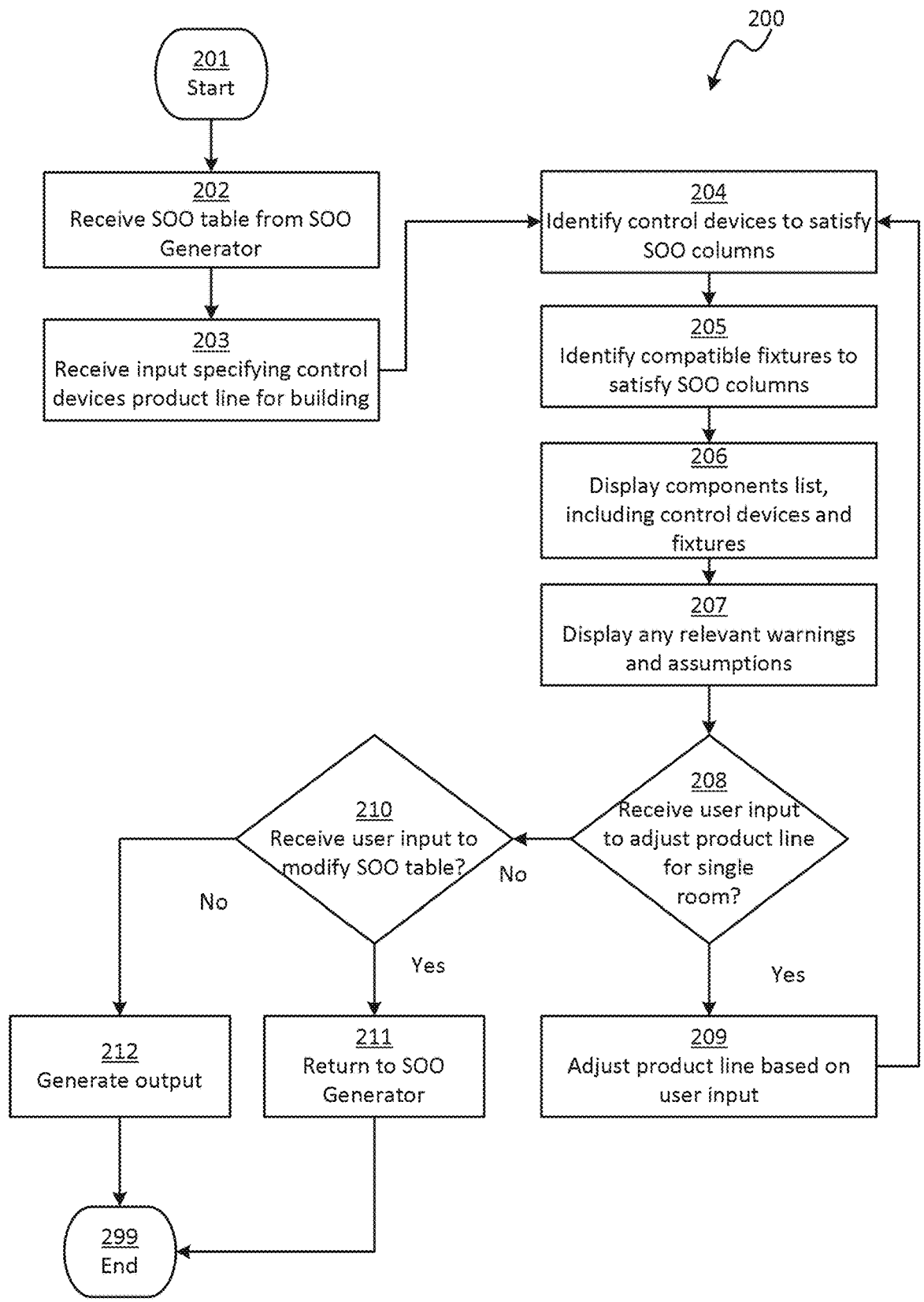
FIG. 2A is a flow diagram depicting a method for automatic generation of a components list to implement a code-compliant sequence of operations, according to one embodiment.

Referring now to FIG. 2A, there is shown a flow diagram depicting a method 200 for automatically generating and editing components list 340, according to one embodiment. In various embodiments, the method depicted in FIG. 2A may be implemented in software, or in a combination of software and hardware, such as using the architecture depicted in FIG. 1A or 1B. In at least one embodiment, the steps are performed by solution generator 122, which may be implemented in software. One skilled in the art will recognize that the particular steps depicted in FIG. 2A are merely exemplary, and that the method can be implemented using other steps.

The system generates components list 340 based on SOO table 311 generated by SOO generator 121, combined with fixtures and control devices data 114 that can be retrieved from any suitable source. In at least one embodiment, prior to performing the steps depicted in FIG. 2A, fixtures and control devices data 114 can be generated and stored, so that they are available for use by solution generator 122.

Figure 2B:
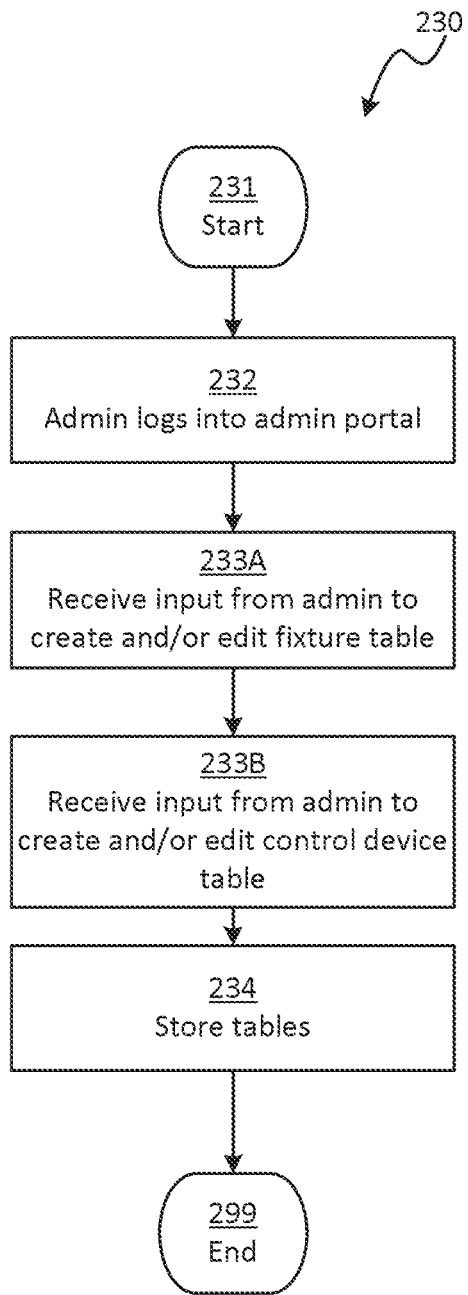
FIG. 2B is a flow diagram depicting a method for generating and/or editing fixtures and control devices data, according to one embodiment.

Referring now to FIG. 2B, there is shown a flow diagram depicting a method 230 for generating and/or editing fixtures and control devices data 114, including fixtures table 116 and control devices table 117, according to one embodiment. The method begins 231. In at least one embodiment, an admin or other user 100 logs into 232 an admin portal for the system. Via the admin portal, the system receives input 233A from the admin to create fixtures table 116, and further receives input 233B from the admin to create control devices table 117. A similar interface and process is used for editing and/or deleting previously created fixtures table 116 and/or control devices table 117.

Fixtures table 116 and control devices table 117 are stored 234 in any suitable manner, such as for example in data store 106 on device 101 and/or server 110 or other cloud-based storage. The method then ends 299.

Subsequently, when the system performs steps to determine which control devices and fixtures to use in implementing a SOO, the system retrieves previously created fixtures and control devices data 114, including fixtures table 116 and control devices table 117. As described below, retrieved fixtures and control devices data 114 is then used, along with SOO table 311, to generate components list 340 for implementing the SOO.

In at least one embodiment, fixtures table 116 and control devices table 117 are created based on user input (such as provided by the admin). The admin also has the ability to edit existing data within fixtures table 116 and control devices table 117, and/or to add new data to such tables, such as records representing additional fixtures and/or control devices. Examples and additional details are provided below, in connection with the descriptions of FIGS. 4A through 4D.

Returning to FIG. 2A, solution generator 122 receives 202 SOO table 311 generated by SOO generator 121, and further receives 203 input (for example, from user 100) specifying a control devices product line to be used for a particular building or structure. In at least one embodiment, various product line options are shown in a user interface, along with brief descriptions of each, and user 100 is given an opportunity to select one. In at least one embodiment, the input received in step 203 specifies the control devices product line for the building as a whole, although user 100 will be given an opportunity to specify different product lines for particular rooms or room types within the building.

Solution generator 122 then automatically identifies 204 control device(s) to use to satisfy the requirements specified in received SOO table 311, based on the selected product line. This determination can be made, for example, based on information from control devices table 117 specifying which SOOs each control device can satisfy.

Solution generator 122 also automatically identifies 205 fixture(s) to use to satisfy the requirements specified in received SOO table 311, based on the selected product line. In at least one embodiment, the determination made in step 205 takes into account compatibility between the selected fixture(s) and the control device(s) identified in step 204. In at least one embodiment, the determination made in step 205 can be based, for example, on information from fixtures table 116 specifying which SOOs each fixture can satisfy, and also specifying compatibility between fixtures and control devices.

The system then displays 206 components list 340, including control devices and fixtures identified in steps 204 and 205, respectively, as satisfying the SOO while maintaining compatibility, and based on the input specifying a control devices product line received in step 203. In at least one embodiment, components list 340 includes various levels of stand-alone control devices as well as control devices embedded in fixtures, to meet SOO requirements in different ways. Various control strategies can be displayed side-by-side for ease of comparison.

In at least one embodiment, solution generator 122 checks whether the determinations in steps 204 and 205 may cause any issues, such as generating any potential conflicts, or causing any system limitations to be exceeded. If any issues exist, solution generator 122 generates and displays 207 any relevant warnings, error messages, and/or assumptions to user 100. Such warnings and messages can be in text form and/or graphical form, and/or can be accompanied by color-coded highlighting, audio alerts, and/or the like. User 100 is then given an opportunity to make further changes and avoid any problems. Alternatively, the system can automatically change to an alternative product line selection if such a change would solve the issue; user 100 is then automatically notified that such a change has been made. In at least one embodiment, user 100 can configure the manner in which warnings and messages are output, and whether automatic changes of product line are to be made in response to such issues.

In at least one embodiment, user 100 can adjust product types on a room-by-room basis, if desired. In response to receiving user input 208 to adjust a product for a single room or room type, solution generator 122 adjusts 209 the product line accordingly, and returns to step 204.

In at least one embodiment, user 100 can modify SOO table 311 if desired. In at least one embodiment, if user input is received 210 to modify SOO table 311, the system returns 211 to SOO generator 121. Once SOO table 311 has been modified, using the techniques described in the above-cited related application, the system returns to the functionality described herein wherein solution generator 122 can generate components list 340 using the modified SOO table 311.

If no further modifications are needed, solution generator 122 generates 212 final output. In at least one embodiment, final output is components list 340 that can include a display of recommended products (including, for example, control devices and fixtures) per room type, grouped by product category.

In at least one embodiment, the generated output includes any or all of the following, in any suitable combination:
  identification of any optional components within a part number that can be customized;
  specification sheets or links thereto (which may include information on ordering options and/or variations);
  one-line connection diagrams of control devices and fixtures in a space;
  room layout diagrams, in the form of "typical" one-line diagrams of rooms including components, such as those generated by the above-cited related application; and/or
  lists of components in any suitable format, such as PDF.

In at least one embodiment, the generated output also includes descriptions of overall network infrastructure and/or backbone devices for the installation; these may include devices that are required or recommended for the entire building or site to support the specified room-by-room control devices.

In at least one embodiment, components list 340 and/or any other output of solution generator 122 can be generated, output, and/or exported in any suitable format, including for example .csv, .json, and/or .dwg format.

In at least one embodiment, components list 340 can be exported to a tool for generating a room layout diagram 341, or "typical" layout, for each room type within the building. Room layout diagram 341 can specify how the various components listed in components list 340 are to be arranged and connected to one another.

The method then ends 299.

Figure 2C:
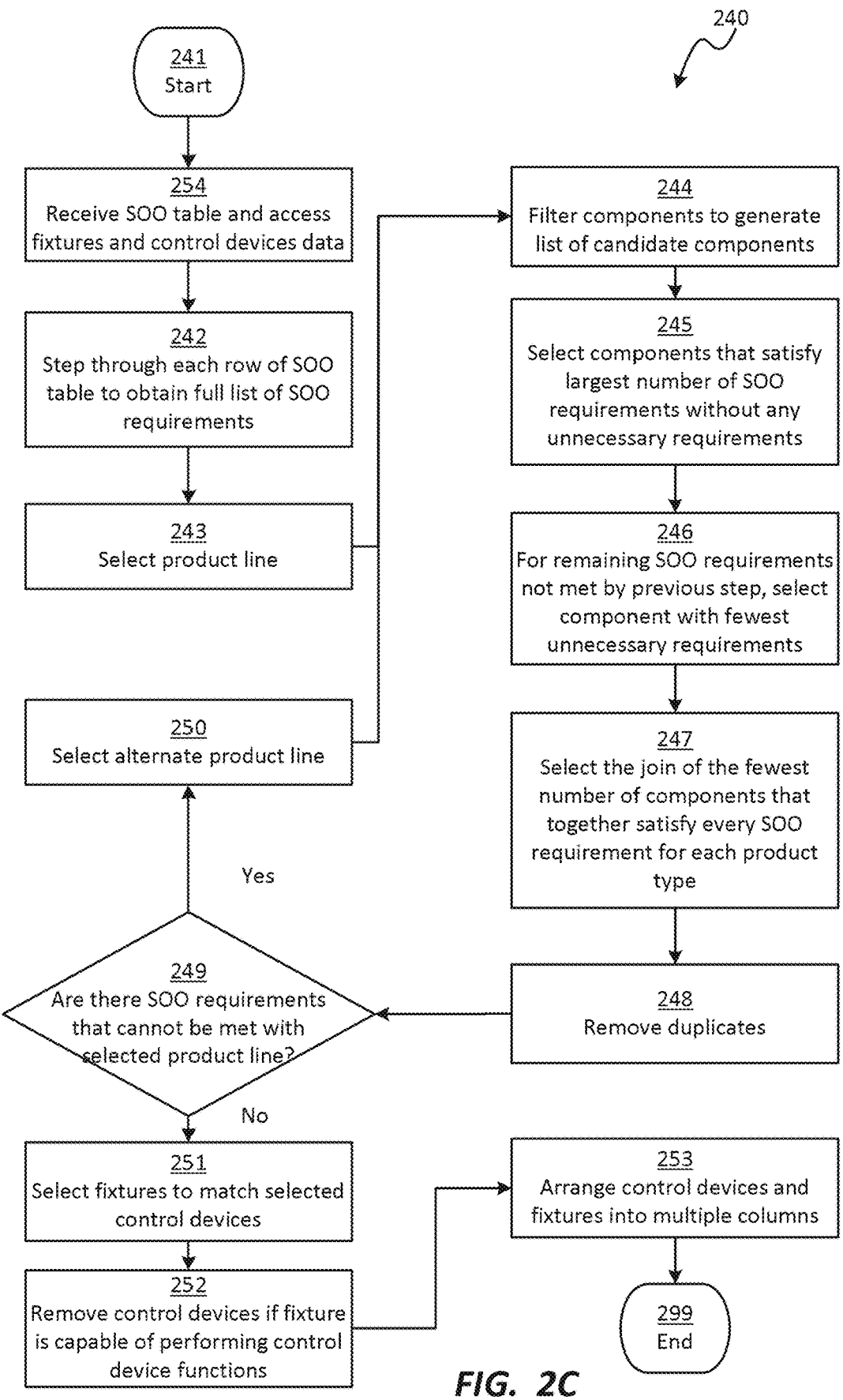
FIG. 2C is a flow diagram depicting a detailed method for automatically generating a components list to implement a code-compliant sequence of operations, according to one embodiment.

Referring now to FIG. 2C, there is shown a flow diagram depicting a detailed method 240 for generating components list 340, according to one embodiment, in particular providing additional details describing steps 204 to 206 of FIG. 2A. In various embodiments, the method depicted in FIG. 2C may be implemented in software, or in a combination of software and hardware, such as using the architecture depicted in FIG. 1A or 1B. One skilled in the art will recognize that the particular steps depicted in FIG. 2C are merely exemplary, and that the method can be implemented using other steps. The method is described as being performed by solution generator 122, although some or all of the steps may be performed by other components.

The method begins 241. Solution generator 122 receives 254 SOO table 311, for example from SOO generator 121 as described above. In at least one embodiment, solution generator 122 also accesses fixtures and control devices data 114, as described above. In at least one embodiment, each component listed in fixtures and control devices data 114 is associated with a product line, one or more types, and a list of SOO columns that the component satisfies.

To select a component, solution generator 122 performs the following steps. First, it steps through 242 each row of SOO table 311 to obtain a full list of SOO requirements for all room types in SOO table 311. Solution generator 122 also selects 243 a product line; this may be based on user input or on some other factor or parameter.

Next, solution generator 122 filters 244 components based on characteristics of each room type; this may include, for example, filtering components based on room size, ceiling height, product line, and/or any other factors or parameters. The result is a list of candidate components.

From this list of candidate components, solution generator 122 selects 245 those components that satisfy the largest number of SOO requirements without any unnecessary requirements. Then, for any remaining SOO requirements that are not satisfied by step 245, solution generator 122 selects 246 components that satisfy those SOO requirements with the fewest unnecessary requirements. If two components satisfy the same number of SOO requirements and have the same number of unnecessary requirements, solution generator 122 uses a specified priority (described below in connection with FIG. 4C) to decide which component to select.

Solution generator 122 then selects 247 the join of the fewest number of components from steps 245 and 246 that together satisfy every SOO requirement for each room type. Any duplicates are removed 248, including for example instances where the same component appears multiple times.

Solution generator 122 then determines 249 whether there are SOO requirements that cannot be met with the selected product line. If so, it selects 250 an alternate product line, and repeats steps 244 through 249.

Solution generator 122 then selects 251 fixtures that are compatible with control devices selected through the above-described steps. Such compatibility can be determined, for example, based on information stored in fixtures table 116 and/or control devices table 117. In some cases, fixtures may be capable of performing control functions; thus, any separate control devices that are deemed redundant because their functions can be performed by fixtures are removed 252 from the list.

Control devices and fixtures are then arranged 253 into multiple columns (such as for example three columns, representing different configurations); the arrangement may be determined, for example, based on fixture recommendation table information. In at least one embodiment, costs and/or other information can be shown for each of the displayed configurations.

In at least one embodiment, the resulting components list 340 can be pared down or otherwise modified to reflect known preferences of user 100, cost limitations, indications as to which solutions or product lines are preferred, and/or any other relevant factors.

In at least one embodiment, solution generator 122 performs the above-described steps to generate components list 340 for an overall building (or building type), and/or for individual rooms (or room types) within a building.

Components list 340 is then displayed for user 100, and the method ends 299. Any suitable format can be used for displaying and/or outputting components list 340.

User Interface for Generating and Editing Components List 340

In at least one embodiment, the screenshots depicted herein can be displayed via a browser, such as Chrome, Firefox, or Internet Explorer, operating at client device 108. User 100 can interact with such a browser using any suitable input and output mechanisms, as are well known in the art. One skilled in the art will recognize that the elements presented in the screenshots can alternatively be presented in other ways, such as via a stand-alone software application on a computing device, an app on a cell phone or tablet, or the like.

Figure 3B:
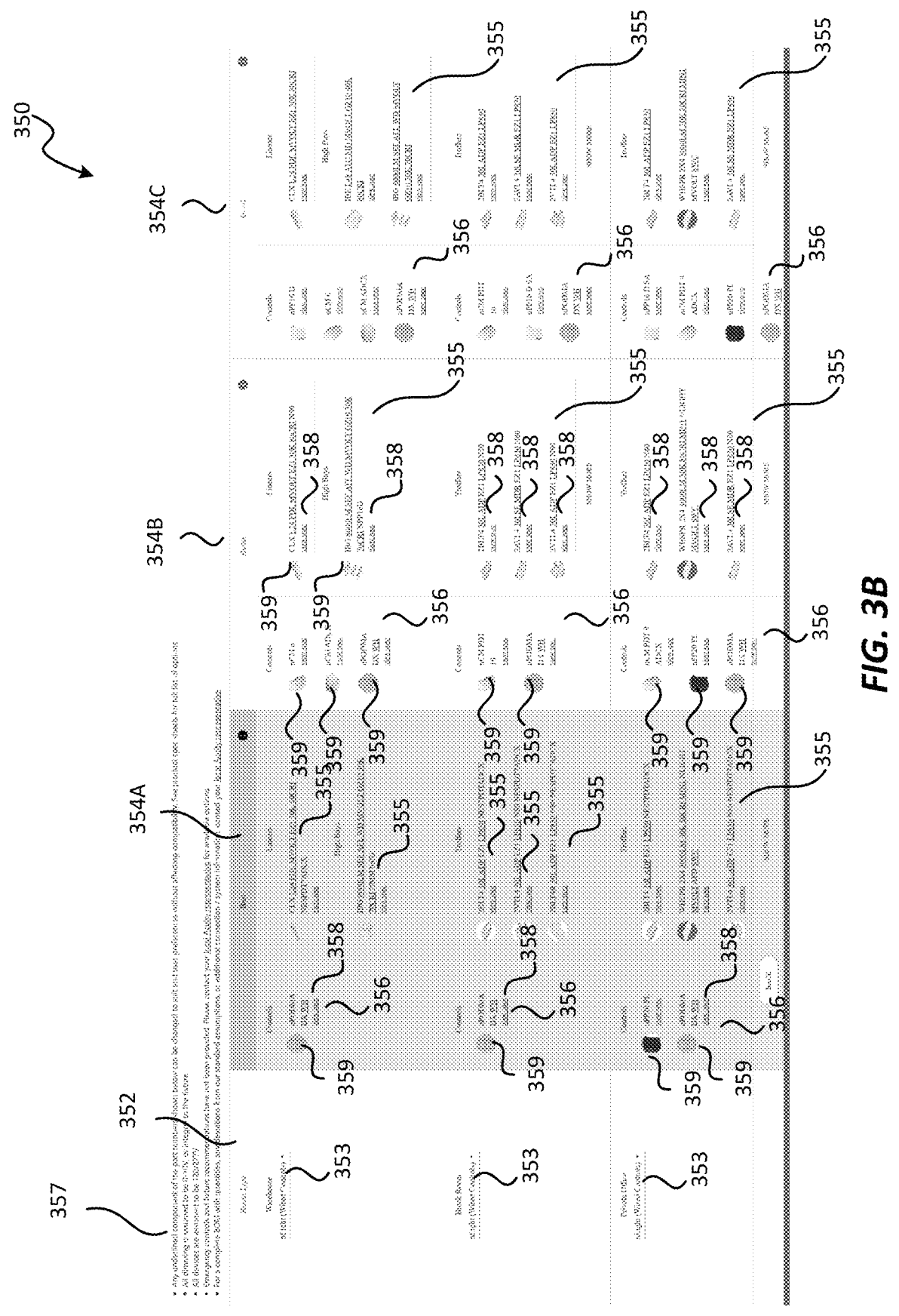

Referring now to FIGS. 3A through 3C, there are shown screenshot diagrams depicting examples of user interface screens for implementing the described system according to one embodiment. Additional details concerning the operation of the described system are presented in these diagrams. However, one skilled in the art will recognize that such details, along with the particular user interface elements and their arrangements and layouts as presented and described are merely exemplary.

FIGS. 3A and 3B are screenshot diagrams depicting examples of a user interface for a screen 350 for presenting components list 340, according to one embodiment. In at least one embodiment, screen 350 is generated by solution generator 122 according to the techniques described above. User 100 can select an overall product line for the building from menu 351, as shown in FIG. 3A. Based on the selected product line, lists of fixtures and control devices are selected and displayed for each room type. In at least one embodiment, components list 340 is organized into columns and ranked based on manufacturer recommendations and/or other factors.

Room types are identified in column 352, and for each room type, one or more possible components list options 354A, 354B, 354C is/are displayed. Each option 354A, 354B, 354C contains a list of components, such as fixtures 355 and control devices 356, that satisfy the requirements of SOO table 311 and that belong to the selected product line. In at least one embodiment, options 354A, 354B, 354C may be labeled as "best", "better", and "good" (or some other appropriate designations), and may differ in cost, availability, or other factors. In at least one embodiment, links 358 to specifications for the various components can be provided; clicking on a link causes the corresponding specifications to be displayed. In at least one embodiment, images 359 of the components can be displayed. Additional notes 357 may also be displayed, as shown in FIG. 3B.

In at least one embodiment, user 100 can select a product line for an individual room type, using menu 353. If user 100 makes such a selection, this choice overrides the overall product line selected from menu 351, for the corresponding room type.

Referring now to FIGS. 4A through 4D, there are shown screenshot diagrams depicting examples of admin screens for the described system according to one embodiment. Additional details concerning the operation of the described system are presented in these diagrams. However, one skilled in the art will recognize that such details, along with the particular user interface elements and their arrangements and layouts as presented and described, are merely exemplary.

Figure 4A:
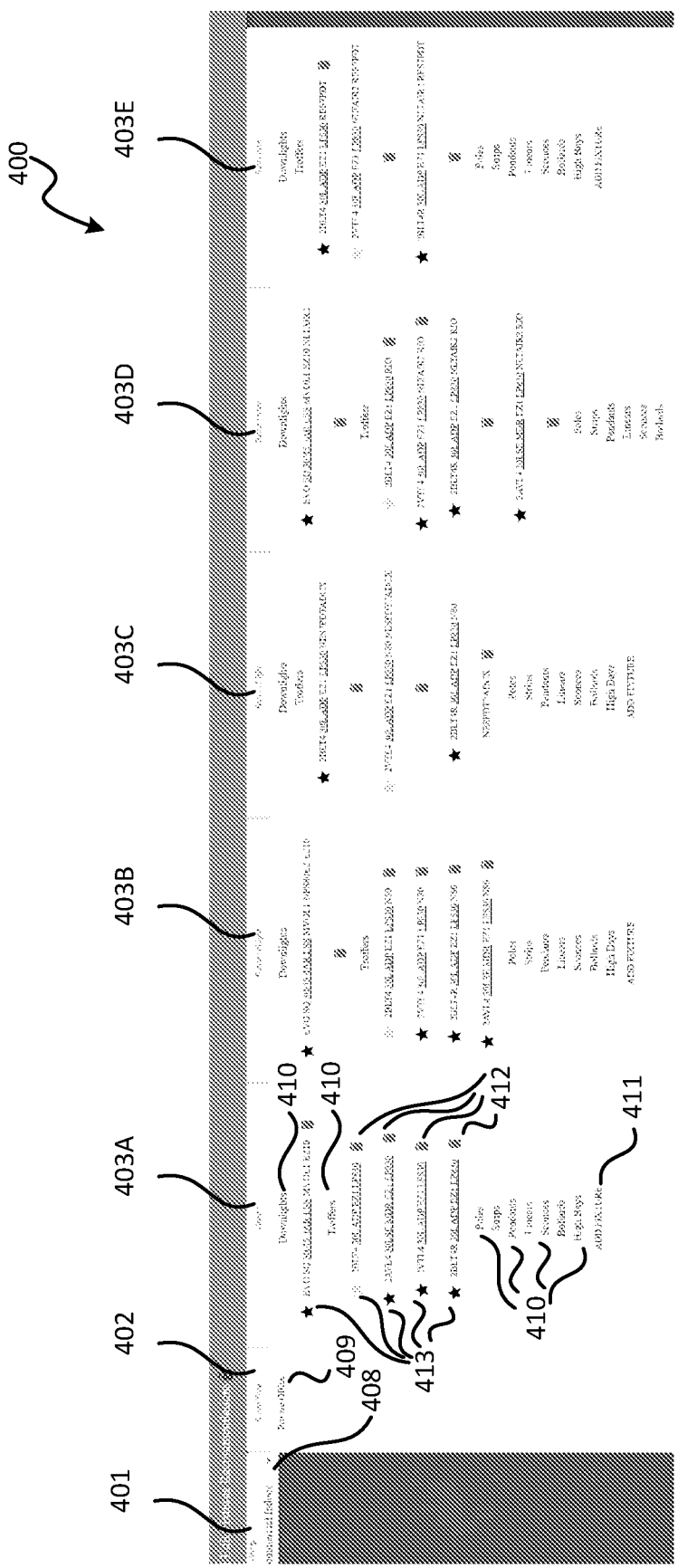
FIG. 4A is a screenshot diagram depicting an example of a user interface for an admin screen for editing fixture recommendations, according to one embodiment.

FIG. 4A is a screenshot diagram depicting an example of a user interface for an admin screen 400 for editing fixture recommendations, according to one embodiment. In at least one embodiment, the fixture recommendations specified via admin screen 400 will be used in generating components lists 340 as described above in connection with FIG. 2A. In particular, in at least one embodiment, the fixture recommendations of screen 400 are used by solution generator 122 when recommending specific fixtures for particular rooms or room types.

If a fixture has no embedded controls, then the full list of control devices required by the SOO generator is shown. However, if a fixture has embedded on/off and raise lower controls, variants for each product line may be provided that may omit those control devices that are redundant in view of the embedded controls. For example, in the column associated with fixtures that have embedded on/off and raise lower controls, 'Relay' type control devices can be omitted, since those are redundant in view of the controls embedded (or integrated) in the fixture.

Similarly, if a fixture has embedded sensors (such as occupancy/daylight sensors), variants for each product line may be provided that may omit those sensors that are redundant in view of the embedded sensors. Here, those sensors that are redundant in view of the embedded sensors are omitted.

By establishing the level of controls present in the fixture within fixtures table 116, once a baseline of control devices (for no embedded fixture options) is established, creating new columns and guaranteeing their compatibility is facilitated by simply knowing which control devices are redundant due to the fixtures, and then removing them from the base list.

An admin (who may be user 100 or another individual) can use admin screen 400 to edit fixture recommendations for any number of groups and room types.

Column 401 identifies the group being edited. The admin can select a group from menu 408.

Column 402 identifies the room type. Different rows can be provided for different room types. In the example, fixtures for the "Private Office" room type 409 are being edited. Although FIG. 4A depicts just one room type 409 and one group, one skilled in the art will recognize that admin screen 400 can be used to display and/or edit multiple room types 409 and groups.

Columns 403A through 403E identify different configurations of fixtures that can be used as the basis for components lists 340 as described above in connection with FIG. 2A. In at least one embodiment, columns 403A through 403E correspond to the various columns 354A through 354C of solution generator 122 output, as shown in the example of FIG. 3B. In at least one embodiment, these columns 354A through 354C are automatically filtered based on compatibility information from fixtures table 116.

As described above, in at least one embodiment, different levels of embedded controls can be specified as being compatible with a particular fixture. For example, three levels of embedded controls can be specified for each fixture: no embedded controls; embedded on/off and raise/lower; and embedded sensors, as follows:

For the "no embedded controls" option, the full list of control devices specified by SOO generator 121 is required.

For the "embedded on/off and raise lower controls" option, solutions may vary depending on product line. For example, a fixture of one product line embedded may not be compatible with a different product line of control devices. In at least one embodiment, the list of compatible control devices omits relays, as those are assumed to be embedded in the fixtures.

For the "embedded sensor controls" option, solutions may again vary depending on product line. In at least one embodiment, the list of compatible control devices omits relays and occupancy/daylight sensors, as those features are assumed to be embedded in the fixtures.

In at least one embodiment, once fixtures are added to a room or room type, the system automatically sorts the fixtures according to room type. The admin can designate certain fixtures as "favorites", so that they will appear at the top of the list of suggestions.

In at least one embodiment, each column 403A through 403E represents a different configuration, which may correspond to a level of quality, brand, manufacturer, or the like. In the depicted example, columns are identified as follows:

Column 403A: Good solutions;
Column 403B: Better solutions using nLight-branded products;
Column 403C: Best solutions using nLight-branded products;
Column 403D: Better solutions using nLight AIR-branded products;
Column 403E: Best solutions using nLight AIR-branded products.

In at least one embodiment, the various configurations correspond to control level descriptions, and can be specified by the admin using an admin screen. An example of such an admin screen is described below, in connection with FIG. 4D.

For each room type, each column 403 includes a list of fixtures recommended for the particular configuration associated with that column. In at least one embodiment, as depicted in FIG. 4A, fixtures can be organized by categories 410, such as for example downlights, troffers, poles, strips, pendants, linears, sconces, bollards, high bays, and/or the like. Within each category 410, any number of fixtures can be shown. In at least one embodiment, each fixture is shown with a link, allowing the admin to click on the link to see additional information about that fixture. Delete icon 412 deletes the fixture. Star icon 413 indicates whether the fixture is a "favorite" (i.e., preferred) so that it will be listed first when it is suitable for a particular configuration. In at least one embodiment, the admin can click on Add Fixture button 411 to add a new fixture to the configuration.

Figure 4B:
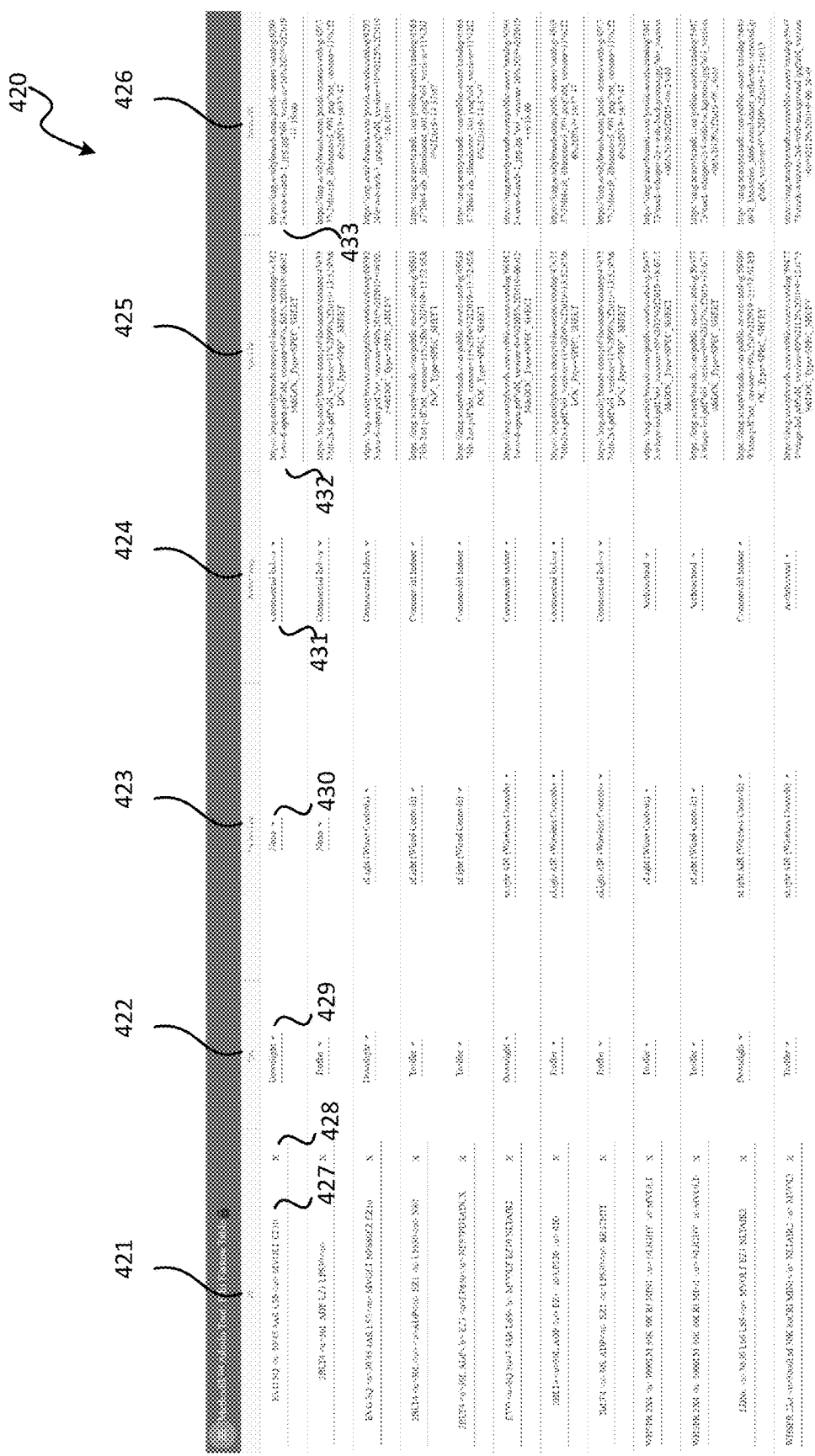
FIG. 4B is a screenshot diagram depicting an example of a user interface for an admin screen for editing a fixtures table, according to one embodiment.

FIG. 4B is a screenshot diagram depicting an example of a user interface for an admin screen 420 for editing fixtures table 116, according to one embodiment. In at least one embodiment, the fixture configurations specified via screen 420 are used in providing options for fixture recommendations as may be selected in admin screen 400 of FIG. 4A. As shown in the example of FIG. 4B, fixtures table 116 may include, for a number of different fixtures, an ID 427, type 429, product line 430, product group 431, link 432 to specification, and link 433 to image URL.

Identifier 427 for each fixture is shown in column 421. The admin can edit identifier 427, or can click on X button 428 to delete the fixture from fixtures table 116.

Type column 422 contains, for each fixture, a pull-down menu 429 allowing the admin to select a type for the fixture. In at least one embodiment, the selected type is used in categorizing the fixture as described above in connection with categories 410 of FIG. 4A, so as to group fixtures under headers when displayed by solution generator 122. Examples of fixture types include downlights, troffers, poles, strips, pendants, linears, sconces, bollards, high bays, and the like.

Product line column 423 contains, for each fixture, a pull-down menu 430 allowing the admin to select a product line for the fixture. In at least one embodiment, the selected product line is used in determining which configuration will contain the fixture (e.g. good/better/best, or nLight vs. nLight AIR, etc.), as described above in connection with columns 403A through 403E of FIG. 4A. In at least one embodiment, product line menu 430 contains options to specify the level of embedded controls present in the fixture, for verification of compatibility with the control devices. For example, a fixture with an embedded sensor is not generally compatible with stand-alone sensors. Examples of product lines include wired and wireless.

Product group column 424 contains, for each fixture, a pull-down menu 431 allowing the admin to select a product group for the fixture. In at least one embodiment, the selected product group is used to select the row(s) in which the product will appear, as described above in connection with column 401 of FIG. 4A. In at least one embodiment, product groups include commercial indoor, architectural, industrial, and/or the like.

Spec link column 425 contains, for each fixture, a link 432 to a specification for the fixture. The admin can edit the link as needed. In at least one embodiment, link 432 specifies the page that will be displayed if user 100 or admin clicks on a link associated with the fixture, such as for example in columns 403A through 403E of FIG. 4A, and/or in "view spec" links 358 shown in FIGS. 3A and 3B.

Picture URL column 426 contains, for each fixture, a link 433 to an image of the fixture, which may show the aesthetic appearance of the fixture. The admin can edit the link as needed. In at least one embodiment, as described above in connection with FIGS. 3A and 3B, images 359 can be shown for each fixture; the locations of the images are specified by links 433.

In at least one embodiment, additional information for each fixture can be stored and/or shown, such as for example various options that can be modified according to installation preferences. These may include, for example, lens type, mounting options, and/or other options that generally do not affect compatibility with control devices.

Figure 4C:
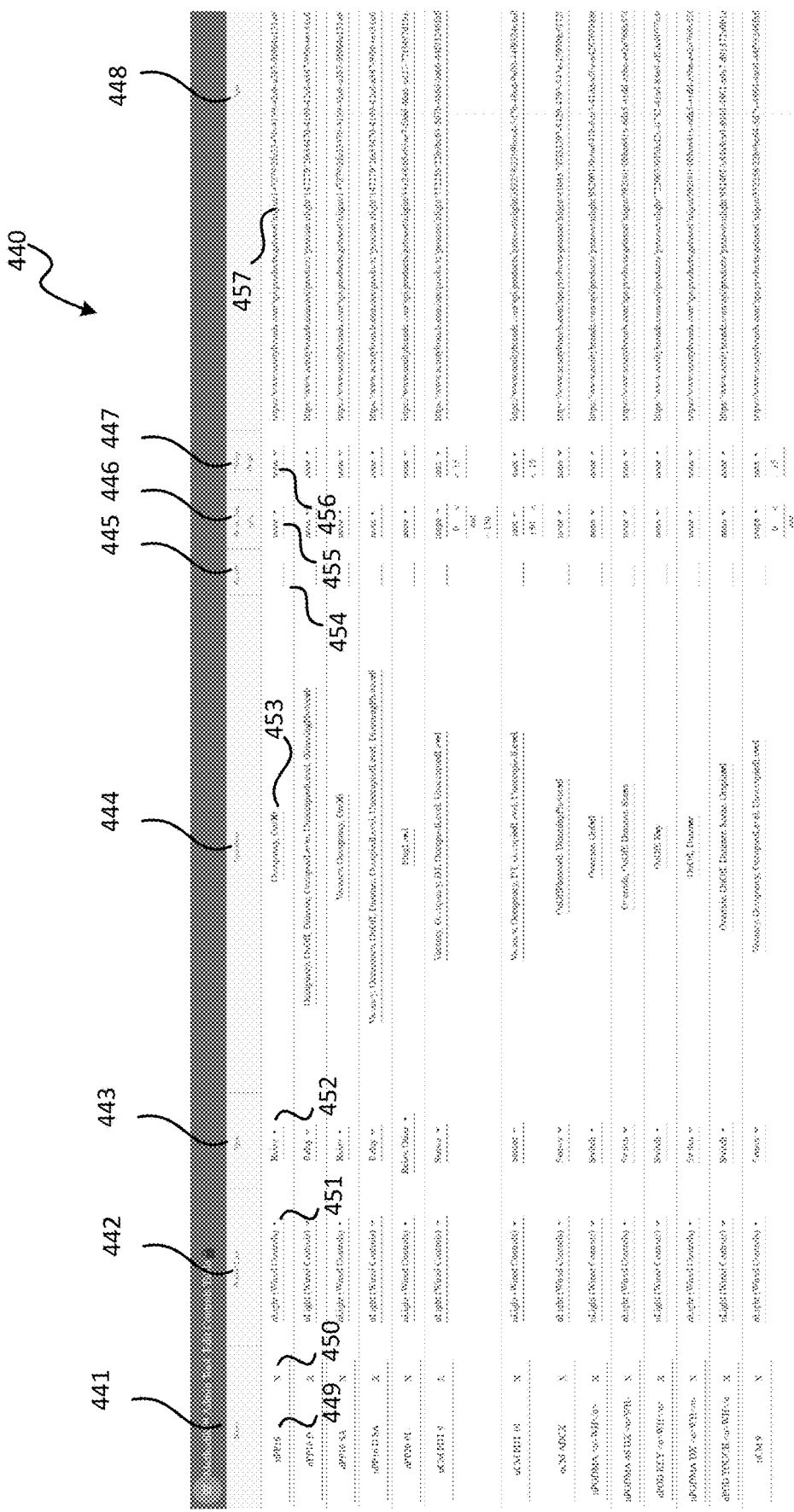
FIG. 4C is a screenshot diagram depicting an example of a user interface for an admin screen for editing a control devices table, according to one embodiment.

FIG. 4C is a screenshot diagram depicting an example of a user interface for an admin screen 440 for editing control devices table 117, according to one embodiment. In at least one embodiment, the control configurations specified via screen 440 are used in providing options for control device recommendations as may be selected in admin screen 400 of FIG. 4A. As shown in the example of FIG. 4C, control devices table 117 may include, for a number of different control devices, a name 449, product line 451, product type(s) 452, list 453 of sequences of operations the device can satisfy, priority 454, room size 455 and ceiling height 456 for which the control device is suitable, and link 457 to a specification for the control device.

Name 449 for each control device is shown in column 441. The admin can edit name 449, or can click on X button 450 to delete the control device from control devices table 117.

Product line column 442 contains, for each control device, a pull-down menu 451 allowing the admin to select a product line for the control device. In at least one embodiment, the selected product line is used in determining which configuration will contain the control device (e.g. good/better/best, or nLight vs. nLight AIR, etc.), as described above in connection with columns 403A through 403E of FIG. 4A. Examples of product lines include wired and wireless.

Type column 443 contains, for each control device, a pull-down menu 452 allowing the admin to select a type for the control device. In at least one embodiment, the selected type is used in categorizing the control device as described above in connection with categories 410 of FIG. 4A. Examples of control device types include relay, sensor, switch, and other.

Operation column 444 allows the admin to specify, via field 453, which operation(s) is/are associated with the control device. In at least one embodiment, the information in column 444 is used to determine when the control device should be recommended for use in implementing a particular SOO, based on the requirements of the SOO. In at least one embodiment, the available operations for column 444 match the user-entered SOO columns.

Priority column 445 allows the admin to specify a priority for the control device, via field 454. In at least one embodiment, this priority can be used to resolve situations where two different control devices are deemed to be suitable for satisfying a given SOO.

Room size column 446 and ceiling height column 447 allow the admin to specify room size and ceiling height for the control device, via fields 455 and 456, respectively. In at least one embodiment, this information can be used as a filter to indicate the types of rooms (in terms of room dimensions) for which the control device may be suitable. Such a filter can be used to limit the applicability of a particular control device to certain rooms or room types based on the specified parameters. In at least one embodiment, room size column 446 contains a minimum and maximum room size, and/or a range, all specified as integers. In at least one embodiment, ceiling height column 447 contains a minimum and maximum ceiling height, and/or a range, all specified as integers.

Spec link column 448 contains, for each control device, a link 457 to a specification for the control device. The admin can edit the link as needed. In at least one embodiment, link 457 specifies the page that will be displayed if user 100 or admin clicks on a link associated with the control device, such as for example in "view spec" links 358 shown in FIGS. 3A and 3B. In at least one embodiment, some part of the part number can be underlined (or otherwise displayed in some distinctive visual manner), to indicate optional segments of the part number (for aesthetic changes such as device color).

Figure 4D:
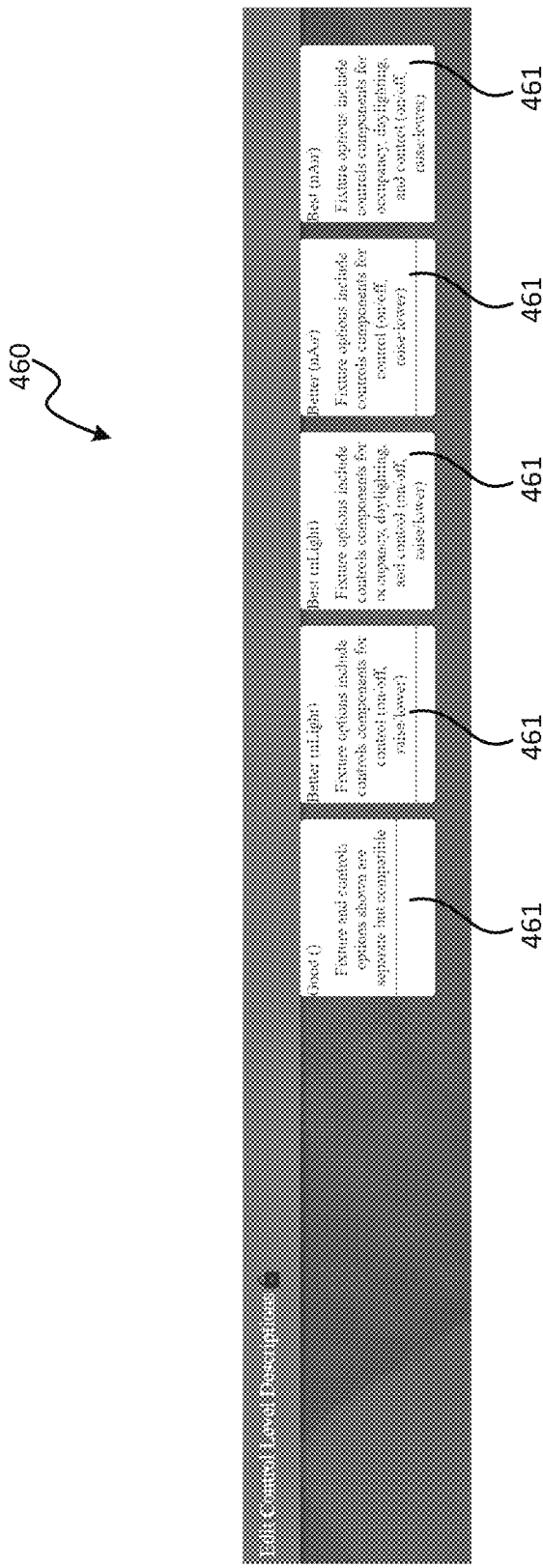
FIG. 4D is a screenshot diagram depicting an example of a user interface for an admin screen for editing control level descriptions, according to one embodiment.

FIG. 4D is a screenshot diagram depicting an example of a user interface for an admin screen 460 for editing various control level descriptions, according to one embodiment. In at least one embodiment, the admin can click on any of boxes 461 to edit a title and/or description for a control level description. In at least one embodiment, the various control level descriptions can be used to define or explain the categories of control devices (and/or fixtures) to be used in columns 403 of FIG. 2A, and may further correspond to the different components list options shown in columns 354 of FIGS. 3A and 3B.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A non-transitory computer-readable medium for automatically generating a components list based on a code-compliant sequence of operations, comprising instructions stored thereon, that when performed by a hardware processor, perform the steps of:
   receiving a sequence of operations table specifying a plurality of requirements;
   causing an input device to receive input specifying a first product line for a building;
   automatically identifying components to satisfy the requirements specified in the sequence of operations table;
   generating a list of the identified components; and
   causing an output device to display the generated list of identified components;
   wherein automatically identifying components to satisfy the requirements specified in the sequence of operations table comprises:
      obtaining an initial list of components corresponding to the specified first product line;
      from the initial list, selecting components that satisfy the largest number of requirements specified in the sequence of operations table while minimizing requirements not specified in the sequence of operations table;
      generating a list comprising the join of the fewest number of components that together satisfy every requirement specified in the sequence of operations table;
      removing duplicate components from the generated list; and
      responsive to at least a subset of the requirements specified in the sequence of operations table not being satisfied by the components in the generated list, selecting an alternate product line and repeating the step of automatically identifying components to satisfy the requirements specified in the sequence of operations table.

2. A non-transitory computer-readable medium for automatically generating a components list based on a code-compliant sequence of operations, comprising instructions stored thereon, that when performed by a hardware processor, perform the steps of:
   receiving a sequence of operations table specifying a plurality of requirements;
   automatically identifying components to satisfy the requirements specified in the sequence of operations table, wherein the components comprise fixtures and control devices;
   for each identified fixture:
      determining whether the fixture is capable of performing at least one associated control function performed by one of the identified control devices; and
      responsive to the determination indicating that the fixture is capable of performing at least one associated control function performed by one of the identified control devices, removing the control device from the list;
   generating a list of the identified components; and
   causing an output device to display the generated list of identified components.

3. The non-transitory computer-readable medium of claim 2, wherein automatically identifying components to satisfy the requirements specified in the sequence of operations table comprises automatically identifying components for each of a plurality of rooms within a building.

4. The non-transitory computer-readable medium of claim 2, wherein automatically identifying components to satisfy the requirements specified in the sequence of operations table comprises automatically identifying components for each of a plurality of room types within a building.

5. The non-transitory computer-readable medium of claim 2, wherein:
   each control device comprises a lighting control device; and
   each fixture comprises a lighting fixture.

6. The non-transitory computer-readable medium of claim 2, wherein automatically identifying components to satisfy the requirements specified in the sequence of operations table comprises automatically identifying control devices and fixtures that are compatible with one another.

7. The non-transitory computer-readable medium of claim 2, further comprising instructions stored thereon, that when performed by the hardware processor, perform the steps of:
   prior to automatically identifying components to satisfy the requirements specified in the sequence of operations table, causing an input device to receive input specifying a first product line for a building;
   and wherein automatically identifying components comprises automatically identifying components belonging to the first product line.

8. The non-transitory computer-readable medium of claim 7, further comprising instructions stored thereon, that when performed by the hardware processor, perform the steps of:
   responsive to at least a subset of the requirements specified in the sequence of operations table not being satisfied by the identified components, selecting an alternate product line and repeating the step of automatically identifying components to satisfy the requirements specified in the sequence of operations table.

9. The non-transitory computer-readable medium of claim 7, further comprising instructions stored thereon, that when performed by the hardware processor, perform the steps of:
   causing the input device to receive input specifying a second product line for at least one room within the building; and
   automatically identifying components belonging to the second product line for the at least one room, to satisfy the requirements specified in the sequence of operations table for the at least one room;
   and wherein automatically identifying components comprises automatically identifying components belonging to the specified product line.

10. The non-transitory computer-readable medium of claim 2, wherein:
    automatically identifying components to satisfy the requirements specified in the sequence of operations table comprises automatically identifying at least two sets of components to satisfy the requirements specified in the sequence of operations table;

generating the list of the identified components comprises generating a plurality of lists, each list corresponding to one of the identified sets of components; and causing the output device to display the generated list of identified components comprises causing the output device to display the plurality of generated lists.

11. The non-transitory computer-readable medium of claim 10, wherein each identified set of components is associated with a different level of integration between control devices and fixtures.

12. The non-transitory computer-readable medium of claim 10, wherein identifying at least two sets of components comprises:

automatically identifying a first set of components wherein no controls are embedded in fixtures;

automatically identifying a second set of components wherein on/off controls are embedded in fixtures;

automatically identifying a third set of components wherein on/off controls and sensor controls are embedded in fixtures.

13. The non-transitory computer-readable medium of claim 2, further comprising:

automatically determining whether any warnings or assumptions are relevant to the generated list; and responsive to the determination indicating that at least one warning or assumption is relevant, causing the output device to display the at least one relevant warning or assumption.

14. The non-transitory computer-readable medium of claim 2, wherein automatically identifying components to satisfy the requirements specified in the sequence of operations table comprises generating a list comprising components that satisfy the largest number of requirements specified in the sequence of operations table while minimizing requirements not specified in the sequence of operations table.

15. The non-transitory computer-readable medium of claim 14, wherein automatically identifying components to satisfy the requirements specified in the sequence of operations table further comprises removing duplicate components from the list.

16. The non-transitory computer-readable medium of claim 14, wherein generating the list comprising components that satisfy the largest number of requirements specified in the sequence of operations table while minimizing requirements not specified in the sequence of operations table comprises:

selecting control devices that satisfy the largest number of requirements specified in the sequence of operations table while minimizing requirements not specified in the sequence of operations table; and selecting fixtures to match the selected control devices.

17. The non-transitory computer-readable medium of claim 16, wherein generating the list comprising components that satisfy the largest number of requirements specified in the sequence of operations table while minimizing requirements not specified in the sequence of operations table further comprises:

for each selected fixture:

determining whether the fixture is capable of performing at least one associated control function performed by one of the selected control devices; and responsive to the determination indicating that the fixture is capable of performing at least one associated control function performed by one of the selected control devices, removing the control device from the list.

18. A method for automatically generating a components list based on a code-compliant sequence of operations, comprising:

at a processor, receiving a sequence of operations table specifying a plurality of requirements;

at an input device, receiving input specifying a first product line for a building;

at the processor, automatically identifying components to satisfy the requirements specified in the sequence of operations table;

at the processor, generating a list of the identified components; and at an output device, displaying the generated list of identified components;

wherein automatically identifying components to satisfy the requirements specified in the sequence of operations table comprises:

obtaining an initial list of components corresponding to the specified first product line;

from the initial list, selecting components that satisfy the largest number of requirements specified in the sequence of operations table while minimizing requirements not specified in the sequence of operations table;

generating a list comprising the join of the fewest number of components that together satisfy every requirement specified in the sequence of operations table;

removing duplicate components from the generated list; and responsive to at least a subset of the requirements specified in the sequence of operations table not being satisfied by the components in the generated list, selecting an alternate product line and repeating the step of automatically identifying components to satisfy the requirements specified in the sequence of operations table.

19. A method for automatically generating a components list based on a code-compliant sequence of operations, comprising:

at a processor, receiving a sequence of operations table specifying a plurality of requirements;

at the processor, automatically identifying components to satisfy the requirements specified in the sequence of operations table, wherein the components comprise fixtures and control devices;

at the processor, for each identified fixture:

determining whether the fixture is capable of performing at least one associated control function performed by one of the identified control devices; and responsive to the determination indicating that the fixture is capable of performing at least one associated control function performed by one of the identified control devices, removing the control device from the list;

at the processor, generating a list of the identified components; and at an output device, displaying the generated list of identified components.

20. The method of claim 19, wherein automatically identifying components to satisfy the requirements specified in the sequence of operations table comprises automatically identifying components for each of a plurality of rooms within a building.

21. The method of claim 19, wherein automatically identifying components to satisfy the requirements specified in the sequence of operations table comprises automatically identifying components for each of a plurality of room types within a building.

22. The method of claim 19, wherein:
   each control device comprises a lighting control device; and
   each fixture comprises a lighting fixture.

23. The method of claim 19, wherein automatically identifying components to satisfy the requirements specified in the sequence of operations table comprises automatically identifying control devices and fixtures that are compatible with one another.

24. The method of claim 19, further comprising:
   prior to automatically identifying components to satisfy the requirements specified in the sequence of operations table, receiving input specifying a first product line for a building;
   and wherein automatically identifying components comprises automatically identifying components belonging to the first product line.

25. The method of claim 24, further comprising:
   responsive to at least a subset of the requirements specified in the sequence of operations table not being satisfied by the identified components, selecting an alternate product line and repeating the step of automatically identifying components to satisfy the requirements specified in the sequence of operations table.

26. The method of claim 24, further comprising:
   receiving input specifying a second product line for at least one room within the building; and
   automatically identifying components belonging to the second product line for the at least one room, to satisfy the requirements specified in the sequence of operations table for the at least one room;
   and wherein automatically identifying components comprises automatically identifying components belonging to the specified product line.

27. The method of claim 19, wherein:
   automatically identifying components to satisfy the requirements specified in the sequence of operations table comprises automatically identifying at least two sets of components to satisfy the requirements specified in the sequence of operations table;
   generating the list of the identified components comprises generating a plurality of lists, each list corresponding to one of the identified sets of components; and
   displaying the generated list of identified components comprises displaying the plurality of generated lists.

28. The method of claim 27,
   wherein each identified set of components is associated with a different level of integration between control devices and fixtures.

29. The method of claim 27,
   wherein identifying at least two sets of components comprises:
   automatically identifying a first set of components wherein no controls are embedded in fixtures;
   automatically identifying a second set of components wherein on/off controls are embedded in fixtures;
   automatically identifying a third set of components wherein on/off controls and sensor controls are embedded in fixtures.

30. The method of claim 19, further comprising:
   at the processor, automatically determining whether any warnings or assumptions are relevant to the generated list; and
   responsive to the determination indicating that at least one warning or assumption is relevant, displaying the at least one relevant warning or assumption at the output device.

31. The method of claim 19, wherein automatically identifying components to satisfy the requirements specified in the sequence of operations table comprises generating a list comprising components that satisfy the largest number of requirements specified in the sequence of operations table while minimizing requirements not specified in the sequence of operations table.

32. The method of claim 31, wherein automatically identifying components to satisfy the requirements specified in the sequence of operations table further comprises removing duplicate components from the list.

33. The method of claim 31, wherein generating the list comprising components that satisfy the largest number of requirements specified in the sequence of operations table while minimizing requirements not specified in the sequence of operations table comprises:
   at the processor, selecting control devices that satisfy the largest number of requirements specified in the sequence of operations table while minimizing requirements not specified in the sequence of operations table; and
   at the processor, selecting fixtures to match the selected control devices.

34. The method of claim 33, wherein generating the list comprising components that satisfy the largest number of requirements specified in the sequence of operations table while minimizing requirements not specified in the sequence of operations table further comprises:
   at the processor, for each selected fixture:
      determining whether the fixture is capable of performing at least one associated control function performed by one of the selected control devices; and
      responsive to the determination indicating that the fixture is capable of performing at least one associated control function performed by one of the selected control devices, removing the control device from the list.

35. A system for automatically generating a components list based on a code-compliant sequence of operations, comprising:
   a hardware processor, configured to perform the steps of:
      receiving a sequence of operations table specifying a plurality of requirements;
      automatically identifying components to satisfy the requirements specified in the sequence of operations table, wherein the components comprise fixtures and control devices; and
      for each identified fixture:
         determining whether the fixture is capable of performing at least one associated control function performed by one of the identified control devices; and
         responsive to the determination indicating that the fixture is capable of performing at least one associated control function performed by one of the identified control devices, removing the control device from the list; and
      generating a list of the identified components; and
   an output device, communicatively coupled to the hardware processor, configured to display the generated list of identified components.

36. The system of claim 35, wherein automatically identifying components to satisfy the requirements specified in the sequence of operations table comprises automatically identifying components for each of a plurality of rooms within a building.

37. The system of claim 35, wherein automatically identifying components to satisfy the requirements specified in the sequence of operations table comprises automatically identifying components for each of a plurality of room types within a building.

38. The system of claim 35, wherein:
each control device comprises a lighting control device; and
each fixture comprises a lighting fixture.

39. The system of claim 35, wherein automatically identifying components to satisfy the requirements specified in the sequence of operations table comprises automatically identifying control devices and fixtures that are compatible with one another.

40. The system of claim 35, further comprising:
an input device, communicatively coupled to the hardware processor, configured to, prior to the hardware processor automatically identifying components to satisfy the requirements specified in the sequence of operations table, receive input specifying a first product line for a building;
and wherein automatically identifying components comprises automatically identifying components belonging to the first product line.

41. The system of claim 40, wherein the hardware processor is further configured to:
responsive to at least a subset of the requirements specified in the sequence of operations table not being satisfied by the identified components, select an alternate product line and repeat the step of automatically identifying components to satisfy the requirements specified in the sequence of operations table.

42. The system of claim 40, wherein:
the input device is further configured to receive input specifying a second product line for at least one room within the building; and
the hardware processor is further configured to automatically identify components belonging to the second product line for the at least one room, to satisfy the requirements specified in the sequence of operations table for the at least one room;
and wherein automatically identifying components comprises automatically identifying components belonging to the specified product line.

43. The system of claim 35, wherein:
automatically identifying components to satisfy the requirements specified in the sequence of operations table comprises automatically identifying a plurality of sets of components to satisfy the requirements specified in the sequence of operations table;
generating the list of the identified components comprises generating a plurality of lists, each list corresponding to one of the identified sets of components; and
displaying the generated list of identified components comprises displaying the plurality of generated lists.

44. The system of claim 43,
wherein each identified set of components is associated with a different level of integration between control devices and fixtures.

45. The system of claim 43,
wherein identifying at least two sets of components comprises:
automatically identifying a first set of components wherein no controls are embedded in fixtures;
automatically identifying a second set of components wherein on/off controls are embedded in fixtures;
automatically identifying a third set of components wherein on/off controls and sensor controls are embedded in fixtures.

46. The system of claim 35, wherein the processor is further configured to perform the steps of:
automatically determining whether any warnings or assumptions are relevant to the generated list; and
responsive to the determination indicating that at least one warning or assumption is relevant, causing the output device to display the at least one relevant warning or assumption.

47. The system of claim 35, wherein automatically identifying components to satisfy the requirements specified in the sequence of operations table comprises generating a list comprising components that satisfy the largest number of requirements specified in the sequence of operations table while minimizing requirements not specified in the sequence of operations table.

48. The system of claim 47, wherein automatically identifying components to satisfy the requirements specified in the sequence of operations table further comprises removing duplicate components from the list.

49. The system of claim 47, wherein generating the list comprising components that satisfy the largest number of requirements specified in the sequence of operations table while minimizing requirements not specified in the sequence of operations table comprises:
selecting control devices that satisfy the largest number of requirements specified in the sequence of operations table while minimizing requirements not specified in the sequence of operations table; and
selecting fixtures to match the selected control devices.

50. The system of claim 49, wherein generating the list comprising components that satisfy the largest number of requirements specified in the sequence of operations table while minimizing requirements not specified in the sequence of operations table further comprises, for each selected fixture:
determining whether the fixture is capable of performing at least one associated control function performed by one of the selected control devices; and
responsive to the determination indicating that the fixture is capable of performing at least one associated control function performed by one of the selected control devices, removing the control device from the list.

51. A system for automatically generating a components list based on a code-compliant sequence of operations, comprising:
an input device, configured to receive input specifying a first product line for a building;
a hardware processor, communicatively coupled to the input device, configured to perform the steps of:
receiving a sequence of operations table specifying a plurality of requirements;
automatically identifying components to satisfy the requirements specified in the sequence of operations table; and
generating a list of the identified components; and
an output device, communicatively coupled to the hardware processor, configured to display the generated list of identified components;
wherein automatically identifying components to satisfy the requirements specified in the sequence of operations table comprises:

obtaining an initial list of components corresponding to the specified first product line;

from the initial list, selecting components that satisfy the largest number of requirements specified in the sequence of operations table while minimizing requirements not specified in the sequence of operations table;

generating a list comprising the join of the fewest number of components that together satisfy every requirement specified in the sequence of operations table;

removing duplicate components from the generated list; and responsive to at least a subset of the requirements specified in the sequence of operations table not being satisfied by the components in the generated list, selecting an alternate product line and repeating the step of automatically identifying components to satisfy the requirements specified in the sequence of operations table.

\* \* \* \* \*